United States Patent [19]
Ota et al.

[11] Patent Number: 6,104,174
[45] Date of Patent: Aug. 15, 2000

[54] HIGH VOLTAGE POWER SUPPLY CIRCUIT

[75] Inventors: Hiroyuki Ota; Masami Furuta, both of Nagano; Syuji Kamada, Osaka, all of Japan

[73] Assignees: Fuji Electric Co., Ltd., Kanagawa; Matsushita Electric Industrial Co. Ltd., Osaka, both of Japan

[21] Appl. No.: 09/299,556

[22] Filed: Apr. 21, 1999

[30] Foreign Application Priority Data

Apr. 28, 1998 [JP] Japan .................................. 10-117693

[51] Int. Cl.⁷ ....................................................... G05F 1/10
[52] U.S. Cl. ........................................... 323/235; 315/411
[58] Field of Search ............................ 315/411; 323/235, 323/271, 286, 287

[56] References Cited

U.S. PATENT DOCUMENTS

| 3,795,835 | 3/1974 | Aldrich et al. | 315/370 |
| 4,090,111 | 5/1978 | Suzuki | 315/411 |

*Primary Examiner*—Shawn Riley
*Attorney, Agent, or Firm*—Pearne & Gordon LLP

[57] ABSTRACT

A speed-up circuit 10 is connected to a detection line 6 for feeding back the high voltage detection value of a high voltage detection circuit 5 to a high voltage stabilizing circuit 1. When a power supply switch is turned on, since a PNP transistor 12 of the speed-up circuit 10 is turned on, a resistor 11 is connected to the detection line 6, so that the high voltage detection value is reduced forcedly. Accordingly, the high voltage stabilizing circuit 1 increases the peak value of a flyback pulse generated by a resonance-type power supply circuit 2 to output higher high voltage thereby to shorten the rising time of the high voltage output supplied to the anode of a CRT. After the lapse of the predetermined time from the turning-on of the power supply switch, since the terminal voltage of a capacitor 13 having been charged through a resistor 14 exceeds almost the voltage at a point A, the PNP transistor 12 is turned off, so that the resistor 11 is separeted from the detection line. Accordingly, the responsibility of the flyback pulse is prevented from being degraded at the time of the abrupt change of the load of the CRT.

5 Claims, 9 Drawing Sheets

POWER SUPPLY SWITCH OF MONITOR pnp TRANSISTOR 12

DIODE 15

FIG. 4A POWER SUPPLY SWITCH OF MONITOR

FIG. 4C DIODE 22

FIG. 4D DIODE 25

FIG. 7
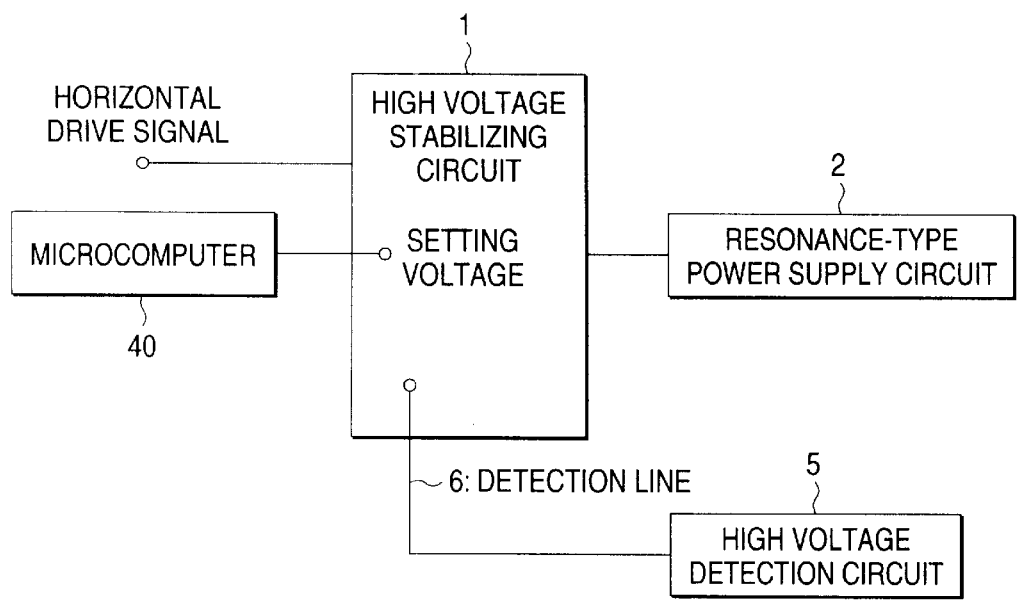
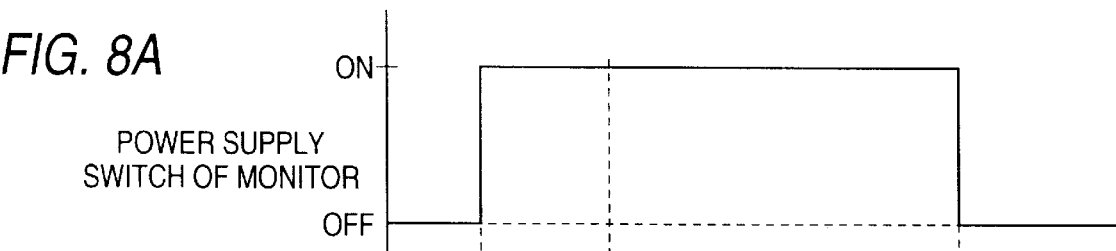
FIG. 8A
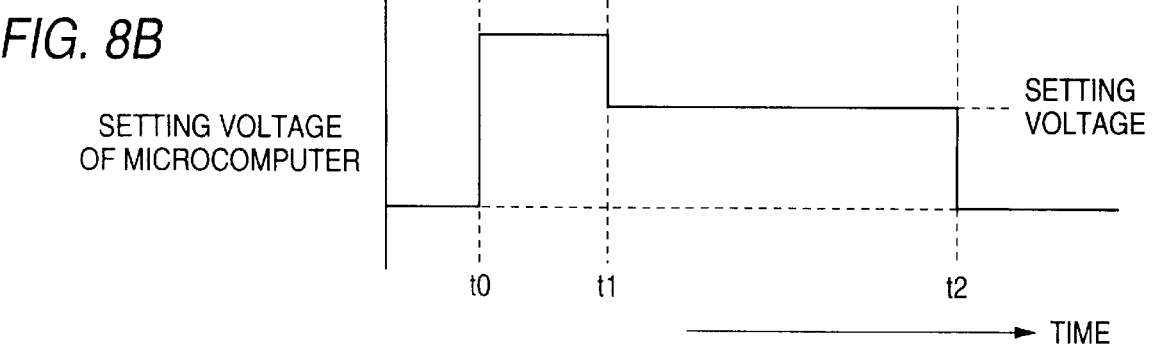
FIG. 8B

HIGH VOLTAGE POWER SUPPLY CIRCUIT

BACKGROUND OF THE INVENTION

1. Field of the Invention

The present invention relates to a high voltage power supply circuit and, more particularly, relates to a high voltage power supply circuit for supplying a high voltage to the anode of a cathode ray tube (CRT) used as a display of a television receiver and a computer display.

2. Description of the Related Art

A CRT is generally used as a display of a television receiver and a computer display (hereinafter referred to as a monitor). The CRT is arranged to apply a high positive voltage to an anode thereof, so that electron emitted from a cathode thereof is attracted to and impinged at a high speed on the phosphor coated on a phosphor screen. A circuit for supplying such a high voltage to the anode is referred to as a high voltage power supply circuit.

FIG. 9 is a block diagram showing an arrangement of a well-known high voltage power supply circuit, in which FIG. 9A shows the fundamental arrangement of the high voltage power supply circuit, and FIG. 9B shows an example of the arrangement of the high voltage power supply circuit formed by taking the rising time of a high output voltage into consideration. FIG. 10 is an explanatory diagram showing an equivalent circuit of a load side of the high voltage power supply circuit.

As shown in FIG. 9A, the high voltage power supply circuit for driving a CRT 101 of a monitor with a high voltage includes a high voltage stabilizing circuit 102 for stabilizing the high output voltage supplied to the CRT 101, a resonance-type power supply circuit 103 for generating a flyback pulse in synchronous with a horizontal drive signal, a flyback transformer 104 for boosting the flyback pulse to a desired voltage value, and a high voltage detection circuit 105 for detecting the change of the boosted high output voltage.

According to such an arrangement, the high voltage generated in the flyback transformer 104 is detected by the high voltage detection circuit 105 and the detected value of the high voltage is fed back to the high voltage stabilizing circuit 102. In accordance with the detected high output voltage, the high voltage stabilizing circuit 102 varies a peak value of the flyback pulse which is generated by the resonance-type power supply circuit 103 in synchronous with the horizontal drive signal, thereby stabilizing the high output voltage.

In order to improve the responsibility of the flyback pulse at the time of the abrupt change of the load of the CRT, as the method for varying the peak value of the flyback pulse, the method for varying the on period of a main switching element of the resonance-type power supply circuit 103 in accordance with the change of the high output voltage in synchronous with the horizontal drive signal has been employed, in place of the method for varying the driving voltage of the resonance-type power supply circuit 103.

However, as shown in FIG. 10, the load of the CRT is represented by a capacitive equivalent circuit in which a capacitor 106 and a variable resistor 107 are connected in parallel. Thus, when the power supply switch of the monitor is turned on, the rising time of the high output voltage supplied to the anode of the CRT 101 becomes long, and hence it takes a long time to display an image on the screen of the CRT.

In order to obviate such a problem, conventionally, a capacitor 108 or a series circuit of the capacitor 108 and a diode 109 is connected between the ground and a node on a detection line from the high voltage detection circuit 105 to the high voltage stabilizing circuit, as shown in FIG. 9B. According to such an arrangement, the detected voltage detected by the high voltage detection circuit 105 is lowered during a period determined by the capacitance of the capacitor after the turning-on of the power supply switch of the monitor. As a result, during the certain period after the turning-on of the power supply switch of the monitor, the high voltage stabilizing circuit 102 forcedly increases the peak value of the flyback pulse of the resonance-type power supply circuit 103, so that the voltage higher than the original voltage is supplied to the anode of the CRT 101, thereby shortening the rising time of the high output voltage.

However, when the capacitor is connected to the node on the detection line for feeding back the high detection voltage to the high voltage stabilizing circuit 102 in this manner, there arises such a problem that the high-frequency gain of the detection line is reduced, and so the responsibility as to the abrupt change of the load of the CRT is degraded in the normal operation period upon the lapse of a certain period after the turning-on of the power supply switch of the monitor.

SUMMARY OF THE INVENTION

The present invention has been made in view of the aforesaid conventional problem and an object of the present invention is to provide a high voltage power supply circuit which can shorten the rising time of the high output voltage supplied to the anode of a CRT at the time of turning-on of the power supply switch of a monitor and does not degrade the responsibility as to the abrupt change of the load of the CRT even in the normal operation period.

In order to achieve the aforesaid object, there is provided a high voltage power supply circuit for supplying a high voltage to an anode of a cathode ray tube, which comprises:

a flyback transformer for boosting a flyback pulse to generate a high output voltage and to supply the high output voltage to the anode of said cathode ray tube;

a resonance power supply circuit, having a main switching element and a resonance capacitor, for generating said flyback pulse in such a manner that a series resonance of said resonance capacitor and a primary winding of said flyback transformer is generated on a basis of a switching operation of said main switching element;

a high voltage detection circuit for detecting the high output voltage boosted by said flyback transformer;

a high voltage stabilizing circuit for stabilizing the high output voltage in such a manner that a peak value of the flyback pulse generated by said resonance power supply circuit is varied on a basis of the high voltage detected value detected by said high voltage detection circuit; and a rising voltage speed-up circuit for forcedly decreasing the detected voltage fed buck from said high voltage detection circuit to said high voltage stabilizing circuit relative to a setting voltage of said high voltage stabilizing circuit during a predetermined period from turning-on of a power supply switch.

According to such a high voltage power supply circuit, the flyback pulse generated by the resonance-type power supply circuit in synchronous with the horizontal drive voltage is boosted by the flyback transformer to produce the high output voltage to be supplied to the anode of the cathode ray tube. In this case, the high output voltage is detected by the high voltage detection circuit and fed back to the high voltage stabilizing circuit. The high voltage stabilizing circuit varies the peak value of the flyback pulse, so that the high output voltage becomes a predetermined high voltage determined by the setting voltage, thereby stabilizing the high output voltage. When the power supply switch is turned on, only during the predetermined period on and after turning-on of the power supply switch, the rising voltage speed-up circuit forcedly decreases the detected voltage fed back from the high voltage detection circuit to the high voltage stabilizing circuit or forcedly increases the setting voltage of the high voltage stabilizing circuit. Accordingly, the high voltage stabilizing circuit operates the resonance-type power supply circuit to increase the peak value of the flyback pulse generated in synchronous with the horizontal drive signal thereby increasing the high output voltage during the predetermined period after the turning-on of the power supply switch. As a result, the rising time of the high output voltage supplied to the anode of the cathode ray tube is shortened at the time of the turning-on of the power supply switch of the monitor. Further, on and after the lapse of the predetermined time after the turning-on of the power supply switch, since the rising voltage speed-up circuit does not influence on the detection line for feeding back the detected voltage from the high voltage detection circuit to the high voltage stabilizing circuit, the responsibility of the flyback pulse is prevented from being degraded at the time of the abrupt change of the load of the CRT.

BRIEF DESCRIPTION OF DRAWINGS

FIGS. 4A, 4B, 4C and 4D are time charts showing the operation of a speed-up circuit of the second embodiment.

FIG. 7 is a circuit diagram showing a main portion of a fourth embodiment of a high voltage power supply circuit according to the present invention.

FIGS. 8A and 8B are time charts showing the operation of a microcomputer in the fourth embodiment.

DETAILED DESCRIPTION OF THE PRESENT INVENTION

Embodiments of the present invention will be described with reference to the accompanying drawings.

Figure 1:
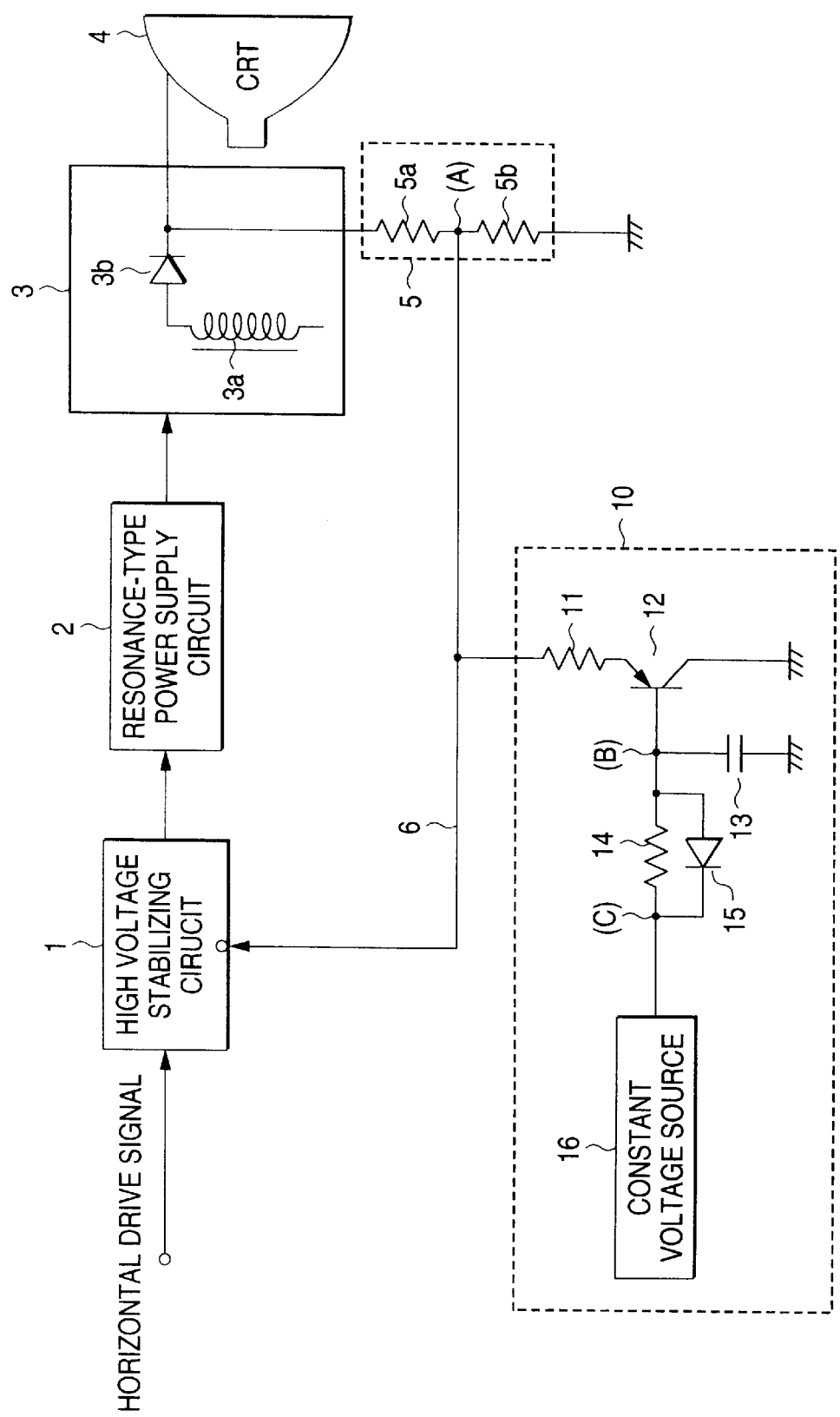
FIG. 1 is a circuit diagram showing a first embodiment of a high voltage power supply circuit according to the present invention.

FIG. 1 is a circuit diagram showing the first embodiment of a high voltage power supply circuit according to the present invention. The high voltage power supply circuit shown in FIG. 1 is formed by a transistor circuit for shortening the rising time of an anode voltage of a CRT at the time of the turning-on of a power supply switch. According to the high voltage power supply circuit of FIG. 1, a high voltage stabilizing circuit 1 for inputting a horizontal drive signal therein is provided, whose output is outputted to a resonance-type power supply circuit 2. The resonance-type power supply circuit 2 includes a resonance capacitor (not shown), which is connected in series with the primary winding of a flyback transformer 3 and a main switching element (not shown). The resonance-type power supply circuit 2 generates a flyback pulse due to the series resonance with the primary winding of the flyback transformer 3 during an off period of the main switching element which operates in synchronism with the horizontal drive signal. The flyback transformer 3 for boosting the flyback pulse includes a rectifying diode 3b connected to the high voltage side terminal of a secondary winding 3a. A cathode of the rectifying diode forms an output of the high voltage power supply circuit, which is connected to the anode of the CRT 4. A high voltage detection circuit 5 is connected between the output of the flyback transformer 3 and the ground. The high voltage detection circuit 5 is formed by two voltage-dividing resistors 5a and 5b. A point (node) A between these voltage-dividing resistors 5a and 5b is connected toward the high voltage stabilizing circuit 1 through a detection line 6.

To the detection line 6, a speed-up circuit 10 is connected for shortening the rising time of the high voltage supplied to the anode of the CRT 4 at the time of the turning-on of the power supply switch of a monitor. In the speed-up circuit 10, one end of a resistor 11 is connected to the detection line 6 and the other end thereof is connected to the emitter of a PNP transistor 12. The collector of the PNP transistor is grounded and the base thereof is connected to one terminal of a capacitor 13. The other terminal of the capacitor 13 is grounded. The base of the PNP transistor 12 is further connected to a parallel circuit of a resistor 14 and a diode 15 which is so arranged that the anode thereof is directed to the base side of the PNP transistor. The other end of the parallel circuit, that is, the cathode of the diode 15 and the other end of the resistor 14 are connected to a constant voltage source 16. The constant voltage source 16 is a circuit for outputting a constant voltage in synchronous with the turning-on of the power supply switch of the monitor. A voltage outputted from the constant voltage source is set to be higher than a voltage at the point A which is detected by the high voltage detection circuit 5 and fed back to the detection line 6 in the normal operation of the monitor. A node between the base of the PNP transistor 12 and the capacitor 13 is referred to as a point B and the output position of the constant voltage source 16 is referred to as a point C.

According to the high voltage power supply circuit thus configured, in the normal operation of the monitor, the flyback transformer 3 boosts the flyback pulse generated by the resonance-type power supply circuit 2 and supplies the boosted high voltage to the anode of the CRT 4. This high voltage supplied to the anode of the CRT 4 is divided by the voltage dividing resistors and detected in the high voltage detection circuit 5. The detected high voltage value, that is, the voltage at the point A is fed back to the high voltage stabilizing circuit 1 through the detection line 6. The high voltage stabilizing circuit 1 varies the peak value of the flyback pulse in synchronous with the horizontal drive signal in accordance with the feedback voltage value thereby to stabilize the high output voltage.

Then, the operation of the speed-up circuit 10 which operates at the time of turning-on of the power supply switch of the monitor will be described with reference to a time chart shown in FIG. 2.

Figure 2A:
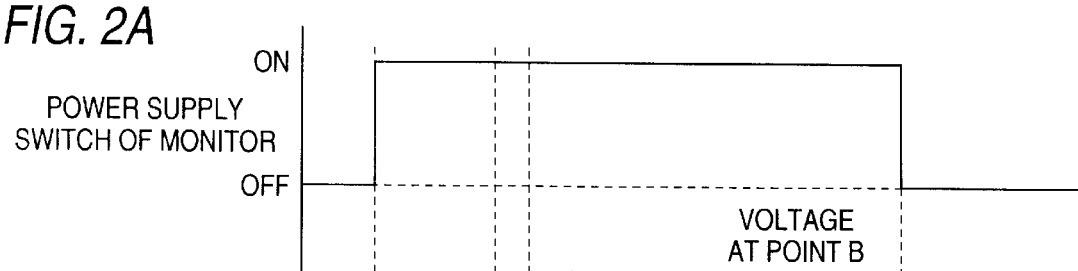
FIGS. 2A, 2B, 2C and 2D are time charts showing the operation of a speed-up circuit of the first embodiment.
Figure 2B:
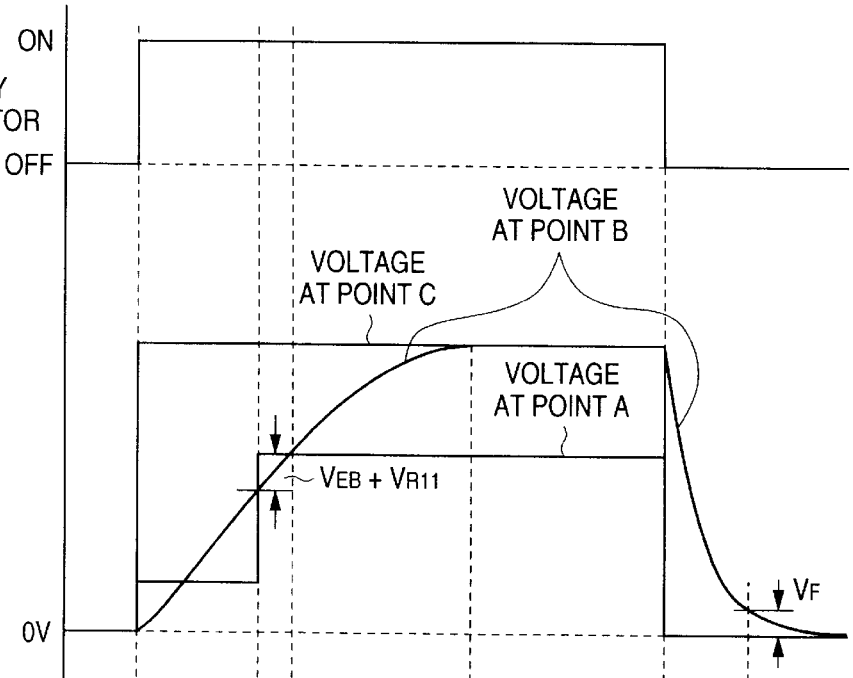
Figure 2C:
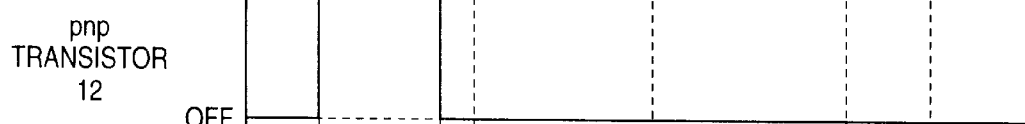
Figure 2D:
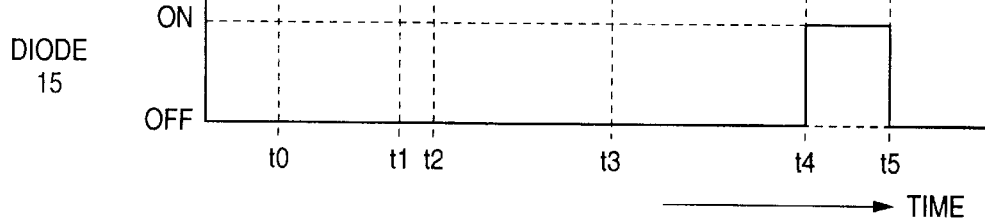

FIGS. 2A, 2B, 2C and 2D are time charts showing the operation of the speed-up circuit. FIG. 2A shows the on and off states of the power supply switch of the monitor. FIG. 2B shows the changing states of the voltage at the point A (the detected voltage of the high voltage detection circuit 5), the voltage at the point B (terminal voltage of the capacitor 13) and the voltage at the point C (the voltage of the constant voltage source 16). FIG. 2C shows the on and off states of the PNP transistor 12. FIG. 2D shows the on and off states of the diode 15.

First, when the power supply switch of the monitor is turned on (the high voltage stabilizing circuit 1 is turned on) at a time point t0, simultaneously the voltage at the point C (the voltage of the constant voltage source 16) and the voltage at the point A (the detected voltage) rise to certain constant voltages, respectively. The voltage at the point C supplied from the constant voltage source 16 is larger than the voltage at the point A, that is, the detected voltage. The voltage at the point B (the terminal voltage of the capacitor 13) changes with a time constant determined by the capacitor 13 and the resistor 14, and gradually increases to the voltage at the point C. In the example of FIGS. 2A, 2B, 2C and 2D, the voltage at the point B becomes same as the voltage at the point A at a time point t2 and then becomes almost same as the voltage at the point C at a time point t3. Thus, the PNP transistor 12 turns on at the time point t0 and then turns off at a time point t1 where the voltage of the capacitor 13 reaches a voltage almost subtracting ($V_{BE}$ (about 0.7V)+$V_{R11}$) from the voltage of the point A. Here, $V_{BE}$ represents a forward voltage of a diode between the emitter and the base of the transistor and $V_{R11}$ represents a voltage across the resistor 11. The PNP transistor maintains the off state on and after the time point t1.

While the PNP transistor 12 is in an on state, the resistor 11 is connected in parallel with the voltage dividing resistor 5b of the high voltage detection circuit 5, so that the voltage dividing ratio of the high voltage detection circuit becomes small. Thus, the high voltage detection value fed back to the high voltage stabilizing circuit 1 becomes smaller because of the reduction of the voltage dividing ratio. In other words, when the PNP transistor 12 turns on, the current flowing into the voltage dividing resistor Sa flows through a path including the resistor 11 having a low impedance and the emitter-collector of the PNP transistor 12. But, the current thereinto scarcely flows through the voltage dividing resistor 5b, so that the detected voltage of the detection line 6 decreases. As a result, since the high voltage stabilizing circuit 1 outputs the signal for increasing the peak value of the flyback pulse, the anode voltage of the CRT 4 rises quickly upon turning-on of the power supply switch of the monitor.

On and after the time point t1, since the PNP transistor 12 is kept in an off state, the current does not flow through the path including the resistor 11 and the PNP transistor 12, so that the detected voltage at the point A is not influenced by the speed-up circuit.

When the power supply switch of the monitor is turned off at a time point t4, the voltages at the points A and C become 0 V immediately. At this time, the diode 15 is turned on, so that the electric charge having been accumulated in the capacitor 13 is rapidly discharged through the diode 15. When the terminal voltage of the capacitor 13, that is, the voltage at the point B reduces until the forward voltage $V_F$ of the diode 15 at a time point t5, the diode 15 is turned off and thereafter the electric charge accumulated in the capacitor 13 is discharged through the resistor 14.

The second embodiment according to the present invention will be explained.

Figure 3:
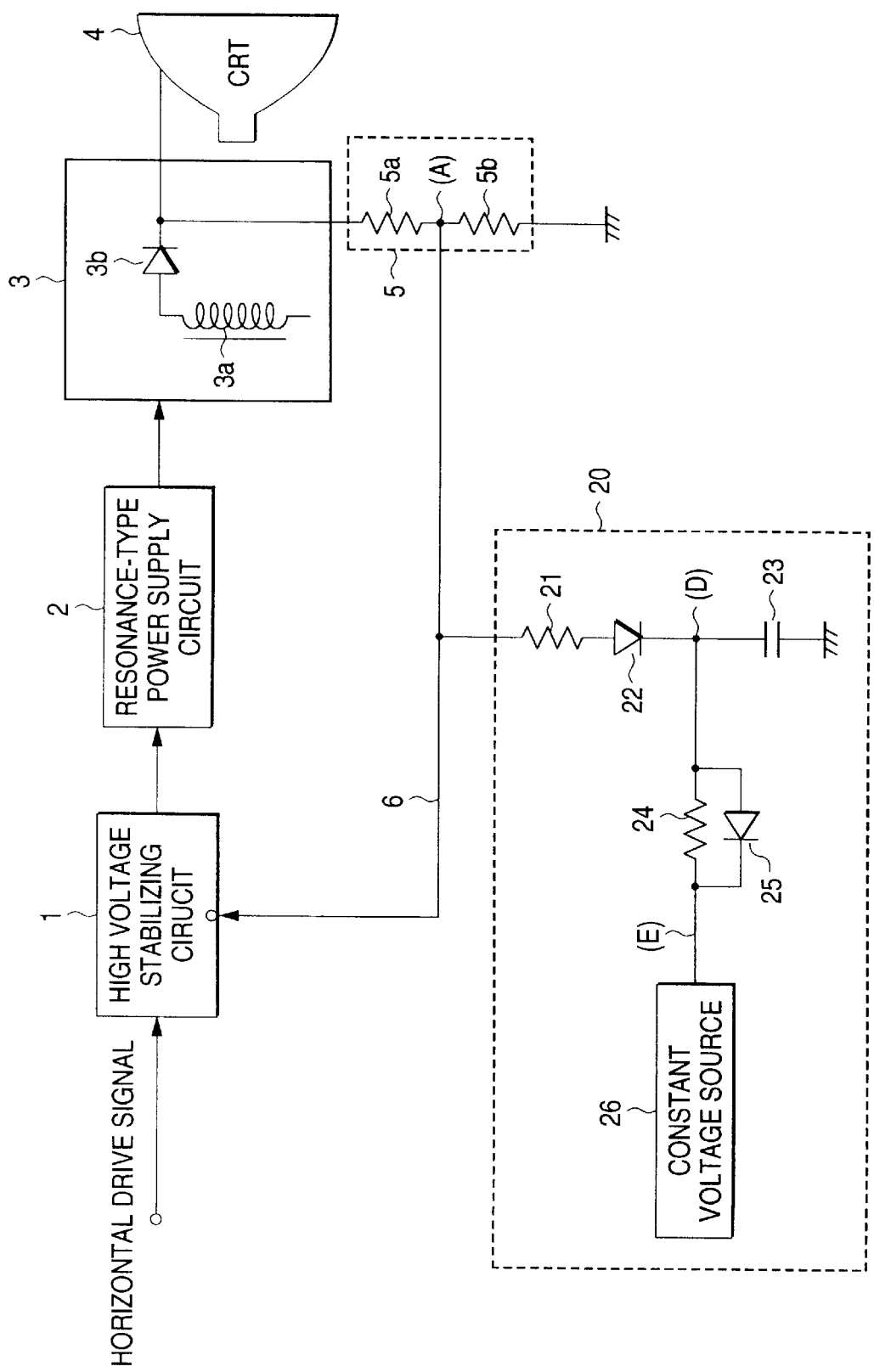
FIG. 3 is a circuit diagram showing a second embodiment of a high voltage power supply circuit according to the present invention.

FIG. 3 is a circuit diagram showing the second embodiment of a high voltage power supply circuit according to the present invention. In the high voltage power supply circuit shown in FIG. 3, the elements same as those shown in FIG. 1 are marked with the same symbols and the detail explanation thereof is omitted. According to the high voltage power supply circuit shown in FIG. 3, the speed-up circuit for shortening the rising time of the anode voltage of the CRT at the time of turning-on of the power supply switch is formed by a capacitor circuit.

That is, to the detection line 6, a speed-up circuit 20 is connected for shortening the rising time of the high voltage applied to the anode of the CRT at the time of turning-on of the power supply switch. In the speed-up circuit 20, one end of a resistor 21 is connected to the detection line 6 and the other end thereof is connected to an anode of a diode 22. A cathode of the diode 22 is connected to a capacitor 23, a resistor 24 and an anode of a diode 25. The other end of the capacitor 23 is grounded. The output of a constant voltage source 26 is introduced into a cathode of the diode 25 and the other end of the resistor 24. The constant voltage source 26 is set to basically output a constant voltage sufficiently higher than the voltage of the detection line 6. A connection point between the diode 22 and the capacitor 23 is referred to as a point D and An output position of the constant voltage source 26 is referred to as a point E.

Then, the operation of the speed-up circuit 20 thus arranged will be described with reference to a time chart shown in FIGS. 4A, 4B, 4C and 4D.

Figure 4B:
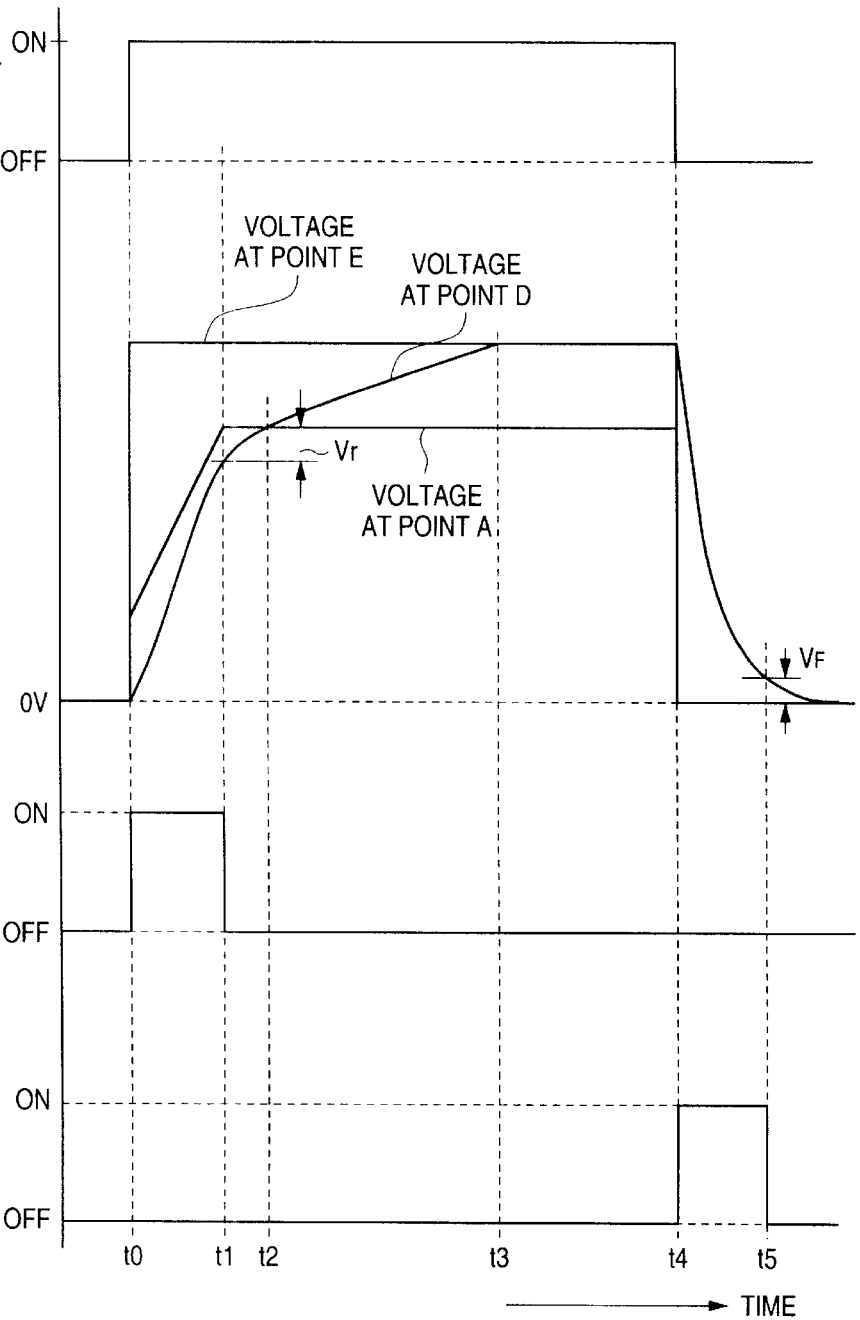

FIGS. 4A, 4B, 4C and 4D are time charts showing the operation of the speed-up circuit. FIG. 4A shows the on and off states of the power supply switch of the monitor. FIG. 4B shows the changing states of the voltage at the point A (the detected voltage of the high voltage detection circuit 5), the voltage at the point D (terminal voltage of the capacitor 23) and the voltage at the point E (the voltage of the constant voltage source 26). FIG. 4C shows the on and off states of the diode 22. FIG. 4D shows the on and off states of the diode 25.

First, when the power supply switch of the monitor is turned on (the high voltage stabilizing circuit 1 is turned on) at a time point t0, simultaneously the voltage at the point E (the detected voltage constant voltage source 26) and the voltage at the point A (the detected voltage) rise to certain constant voltages, respectively. In this case, the voltage at the point E supplied from the constant voltage source 26 is larger than the voltage at the point A, that is, the detected voltage. The voltage at the point D (the terminal voltage of the capacitor 23) changes with a time constant determined by the capacitor 23 and the resistor 24, and gradually increases to the voltage at the point E. In accordance with the increase of the voltage at the point D, the voltage at the point A also increases gradually until being stabilized or to be a steady state. In FIGS. 4A, 4B, 4C and 4D, the voltage at the point D becomes same as the voltage at the point A at a time point t2 and then becomes almost same as the voltage at the point E at a time point t3. Thus, the diode 22 turns on at the time point t0 and then turns off at a time point t1 where the voltage of the capacitor 23 reaches a voltage almost subtracting the sum of the forward voltage (0.7 V) of the diode 22 and the voltage across the resistor 21 from the voltage of the point A. This diode maintains the off state on and after the time point t1. Thus, on and after the time point t1, the voltage at the point D increases with the time constant determined by the capacitor 23 and the resistor 24, and gradually increases up to the voltage at the point E. While the diode 22 is in an on state, the current flowing into the voltage dividing resistor 5a flows through a path including the resistor 21 having a low impedance and the diode 22 but scarcely flows through the voltage dividing resistor 5b. As a result, the high detected voltage value fed back to the high voltage stabilizing circuit 1 becomes small, so that the peak value of the flyback pulse is controlled to be raised and so the anode voltage of the CRT increases quickly upon turning-on of the power supply switch of the monitor. On and after the time t1, since the diode 22 is kept in an off state, the current does not flow through the path including the resistor 21 and the diode 22, so that the detected voltage at the point A is not influenced by the speed-up circuit.

When the power supply switch of the monitor is turned off at a time point t4, since the output voltage of the constant voltage source 26 become 0 V, the diode 25 is turned on and hence the electric charge having been accumulated in the capacitor 23 is rapidly discharged through the diode 25. When the terminal voltage of the capacitor 23 reduces until a voltage equal to or less than the forward voltage of the diode 25 at a time point t5, the diode 25 is turned off and thereafter the electric charge accumulated in the capacitor 23 is discharged through the path including the resistor 24.

The third embodiment according to the present invention will be described as follows.

Figure 5:
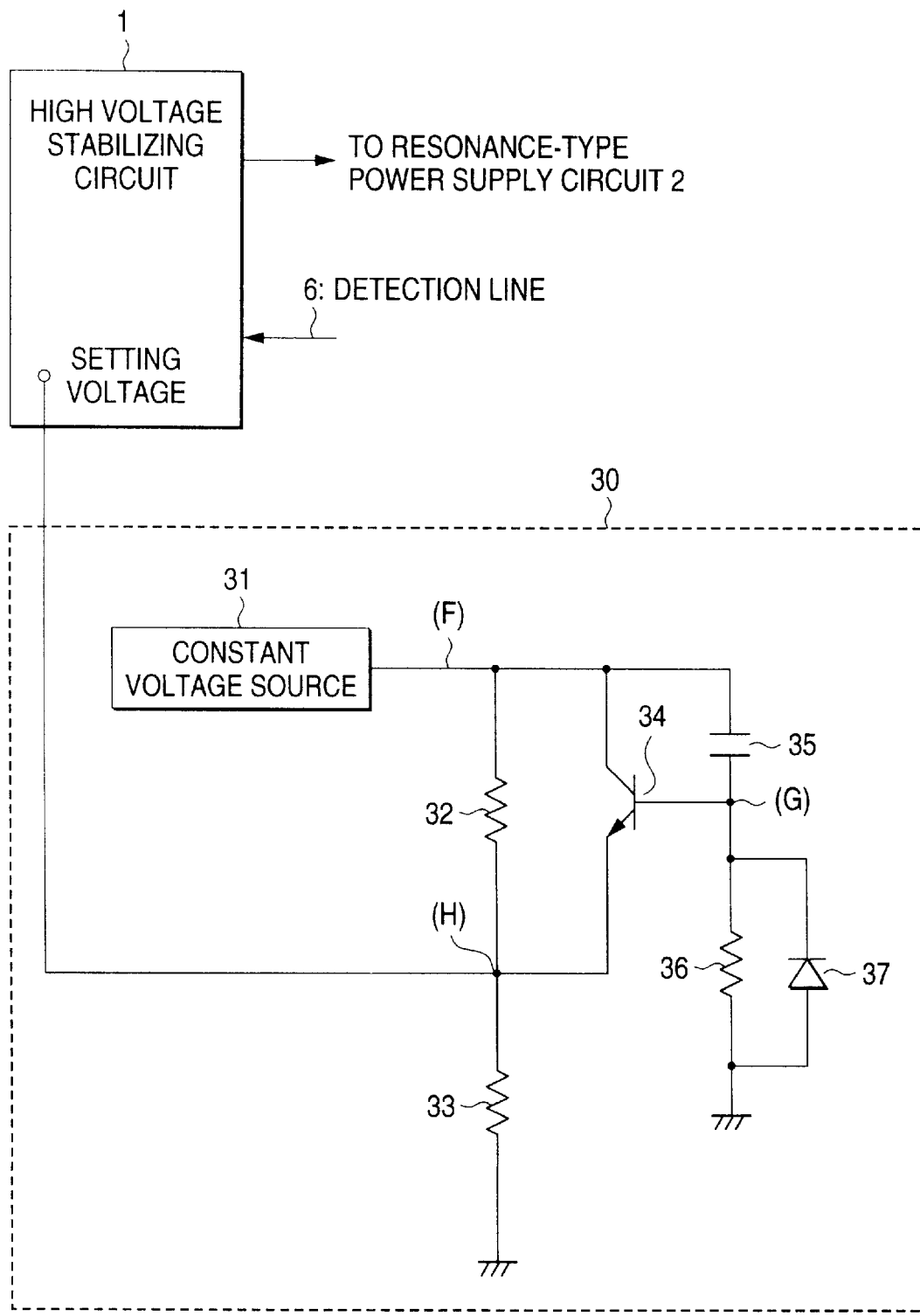
FIG. 5 is a circuit diagram showing a main portion of a third embodiment of a high voltage power supply circuit according to the present invention.

FIG. 5 is a circuit diagram showing a main portion of the third embodiment of a high voltage power supply circuit according to the present invention. According to the high voltage power supply circuit shown in FIG. 5, the speed-up circuit for shortening the rising time of the anode voltage of the CRT at the time of turning-on of the power supply switch is formed by a circuit capable of varying the setting voltage of the high voltage stabilizing circuit 1.

A speed-up circuit 30 for shortening the rising time of the high voltage supplied to the anode of the CRT 4 at the time of turning-on of the power supply switch of the monitor includes a constant voltage source 31, whose output is connected to two serially connected voltage dividing resistors 32 and 33 forming a voltage divider. The output of the constant voltage source 31 is also connected to a collector of a NPN transistor 34 and a capacitor 35. An emitter of the NPN transistor 34 is connected to the common connecting portion of the voltage dividing resistors 32 and 33. A base of the NPN transistor 34 is connected to the other end of the capacitor 35, a resistor 36 and a cathode of a diode 37. The other end of the resistor 36 and an anode of the diode 37 are grounded. The common connecting portion of the voltage dividing resistors 32 and 33 is connected to the setting voltage input terminal of the high voltage stabilizing circuit 1. The voltage dividing resistors 32 and 33 divide the output voltage of the constant voltage source 31 to form a reference voltage signal to be compared with a high voltage detected value fed back from a high voltage detection circuit 5, which supplies the reference voltage signal to the high voltage stabilizing circuit 1. In FIG. 5, the collector of the NPN transistor 34 is referred to as a point F, the base of the NPN transistor 34 is referred to as a point G and the emitter of the NPN transistor 34 is referred to as a point H.

Then, the operation of the speed-up circuit 30 of the setting voltage varying type thus arranged will be explained with reference to a time chart shown in FIGS. 6A, 6B, 6C and 6D.

Figure 6:
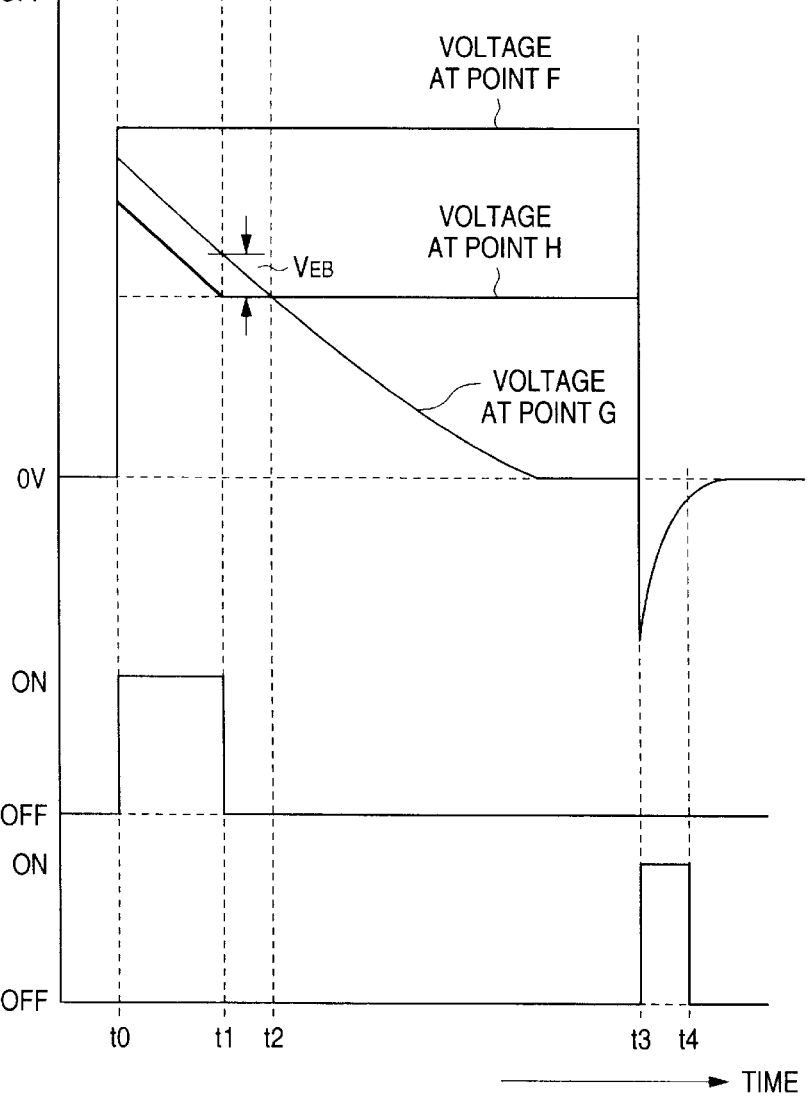
FIGS. 6A, 6B, 6C and 6D are time charts showing the operation of a speed-up circuit of the third embodiment.

FIGS. 6A, 6B, 6C and 6D are time charts showing the operation of the speed-up circuit. FIG. 6A shows the on and off states of the power supply switch of the monitor. FIG. 6B shows the changing states of the voltage at the point F (the collector voltage of the NPN transistor 34), the voltage at the point G (the base voltage of the NPN transistor 34) and the voltage at the point H (the emitter voltage of the NPN transistor 34). FIG. 6C shows the on and off states of the NPN transistor 34. FIG. 6D shows the on and off states of the diode 37.

First, when the power supply switch of the monitor is turned on (the high voltage stabilizing circuit 1 is turned on) at a time point t0, simultaneously the voltage at the point F (the collector voltage of the NPN transistor 34) rises to the voltage supplied from the constant voltage source 31. The voltage at the point G also rises at the time point t0 and thereafter gradually decreases with a time constant determined by the capacitor 35 and the resistor 36 and finally becomes almost 0 V. The voltage at the point H also rises at the time point t0 and thereafter gradually decreases. At a time point t1, the voltage at the point H reduces to a voltage subtracting the forward voltage (about 0.7 V) of a diode between the emitter and the base of the NPN transistor 34 from the voltage at the point G. As a result, the NPN transistor 34 turns off at the time point t1, so that the voltage at the point H becomes same as the setting voltage determined by the voltage dividing resistors 32 and 33. The voltage at the point H is kept at the setting voltage until a time point t3 where the power switch of the monitor is turned off. Accordingly, since the NPN transistor 34 is in an on state only during the period from the time point t0 to the time point t1, the high voltage stabilizing circuit 1 outputs a signal for raising the peak value of the flyback pulse so as to make the setting voltage higher than the detected voltage thereby to raise the anode voltage of the CRT quickly.

On and after the time point t1, since the NPN transistor 34 is kept in an off state, the setting voltage is not influenced by the speed-up circuit.

When the power supply switch of the monitor is turned off at the time point t3, since the output voltage of the constant voltage source 31 become 0 V, the diode 37 is turned on and hence the electric charge having been accumulated in the capacitor 35 is rapidly discharged through the diode 37. When the terminal voltage of the capacitor 35 reduces to a voltage equal to or less than the forward voltage of the diode 37 at a time point t4, the diode 37 is turned off and thereafter the electric charge accumulated in the capacitor 35 is discharged through the path including the resistor 36.

The fourth embodiment according to the present invention will be explained.

FIG. 7 is a circuit diagram showing a main portion of the fourth embodiment of a high voltage power supply circuit according to the present invention. According to the high voltage power supply circuit shown in FIG. 7, the speed-up circuit for shortening the rising time of the anode voltage of the CRT at the time of turning-on of the power supply switch of the monitor is formed by a microcomputer 40 for controlling the setting voltage of the high voltage stabilizing circuit 1. That is, the output of the microcomputer 40 is connected to the setting voltage input terminal of the high voltage stabilizing circuit 1. The detection line 6 from a high voltage detection circuit 5 is connected to the input terminal of the microcomputer to which the high output voltage value being fed back is inputted, and the output of the microcomputer is connected to a resonance-type power supply circuit 2.

Then, the operation of the speed-up circuit of the microcomputer type thus arranged will be described with reference to a time chart shown in FIGS. 8A and 8B.

FIGS. 8A and 8B are time charts showing the operation of the microcomputer. FIG. 8A shows the on and off states of the power supply switch of the monitor. FIG. 8B shows the changing state of the setting voltage of the microcomputer.

First, when the power supply switch of the monitor is turned on (the high voltage stabilizing circuit 1 is turned on) at a time point t0, simultaneously the microcomputer 40 outputs the setting voltage higher than the setting voltage in the normal operation until a time point t1. On and after the time point t1, the microcomputer restores the output voltage to the normal setting voltage. When the power supply switch of the monitor is turned off at a time point t2, the setting voltage of the microcomputer 40 is set to zero.

Accordingly, since the setting voltage of the high voltage stabilizing circuit 1 is higher than the detected voltage only during the period from the time point t0 to the time point t1, the high voltage stabilizing circuit 1 outputs a signal for raising the peak value of the flyback pulse to the resonance-type power supply circuit 2. As a result, the anode voltage of the CRT increases quickly at the time of turning-on of the power supply switch of the monitor.

As described above, according to the present invention, there is provided the speed-up circuit for the rising voltage such that the detected voltage fed back from the high voltage detection circuit to the high voltage stabilizing circuit is decreased forcedly relative to the setting voltage of the high voltage stabilizing circuit during a predetermined period on and after the turning-on of the power supply switch. Accordingly, during the predetermined period after the turning-on of the power supply switch, the high voltage stabilizing circuit increases the peak value of the flyback pulse so as to output higher high output voltage, thereby shortening the rising time of the high voltage output supplied to the anode of the CRT. Further, during the normal operation after the lapse of the predetermined time from the turning-on of the power supply switch, since the speed-up circuit for the rising voltage is insulated from the detection line for feeding back the detected voltage from the high voltage detection circuit to the high voltage stabilizing circuit, the responsibility of the flyback pulse is prevented from being degraded at the time of the abrupt change of the load of the CRT.

What is claimed is:

1. A high voltage power supply circuit for supplying a high voltage to an anode of a cathode ray tube, said high voltage power supply circuit comprising:

a flyback transformer for boosting a flyback pulse to generate a high output voltage and to supply the high output voltage to the anode of said cathode ray tube;

a resonance power supply circuit, having a main switching element and a resonance capacitor, for generating said flyback pulse in such a manner that a series resonance of said resonance capacitor and a primary winding of said flyback transformer is generated on a basis of a switching operation of said main switching element;

a high voltage detection circuit for detecting the high output voltage boosted by said flyback transformer;

a high voltage stabilizing circuit for stabilizing the high output voltage in such a manner that a peak value of the flyback pulse generated by said resonance power supply circuit is varied on a basis of the high voltage detected value detected by said high voltage detection circuit; and a rising voltage speed-up circuit for forcedly decreasing the detected voltage fed back from said high voltage detection circuit to said high voltage stabilizing circuit relative to a setting voltage of said high voltage stabilizing circuit during a predetermined period from turning-on of a power supply switch.

2. The high voltage power supply circuit as claimed in claim 1, wherein said rising voltage speed-up circuit includes:

a constant voltage source for supplying a voltage higher than the detected voltage fed back from said high voltage detection circuit to said high voltage stabilizing circuit during turning-on of the power supply switch;

a first resistor connected to an output of said constant voltage source;

a capacitor charged through said first resistor;

a switching element which is turned on at a time of turning-on of the power supply switch and turned off when a terminal voltage of said capacitor exceeds the detected voltage from said high voltage detection circuit; and a second resistor connected between a detection line from said high voltage detection circuit to said high voltage stabilizing circuit and said switching element.

3. The high voltage power supply circuit as claimed in claim 1, wherein said rising voltage speed-up circuit includes:

a constant voltage source for supplying a voltage higher than the detected voltage fed back from said high voltage detection circuit to said high voltage stabilizing circuit during turning-on of the power supply switch;

a first resistor connected to an output of said constant voltage source;

a capacitor charged through said first resistor on and after turning-on of the power supply switch;

a diode whose cathode side is connected to a node between said first resistor and said capacitor; and a second resistor connected between a detection line from said high voltage detection circuit to said high voltage stabilizing circuit and an anode of said diode.

4. The high voltage power supply circuit as claimed in claim 1, wherein said rising voltage speed-up circuit includes:

a constant voltage source for supplying a voltage higher than the detected voltage fed back from said high voltage detection circuit to said high voltage stabilizing circuit during the turning-on of the power supply switch;

a capacitor connected to an output of said constant voltage source;

a first resistor connected between said capacitor and a ground;

a series circuit of second and third resistors connected between the output of said constant voltage source and the ground, in which a node between said second and third resistors is connected to a setting voltage input of said high voltage stabilizing circuit; and a NPN transistor having a collector connected to the output of said constant voltage source, a base connected to a node between said capacitor and said first resistor and an emitter connected to said node between said second and third resistors.

5. A high voltage power supply circuit as claimed in claim 1, wherein said rising voltage speed-up circuit includes a microcomputer for supplying a setting voltage to a setting voltage input portion of said high voltage stabilizing circuit, which sets the setting voltage at a high voltage during a predetermined period on and after turning-on of said power supply switch and sets the setting voltage to a voltage of a normal operation after a lapse of said predetermined period.

* * * * *

UNITED STATES PATENT AND TRADEMARK OFFICE
CERTIFICATE OF CORRECTION

PATENT NO.   : 6,104,174
DATED        : August 15, 2000
INVENTOR(S)  : Ota et al.

Figure 9A:
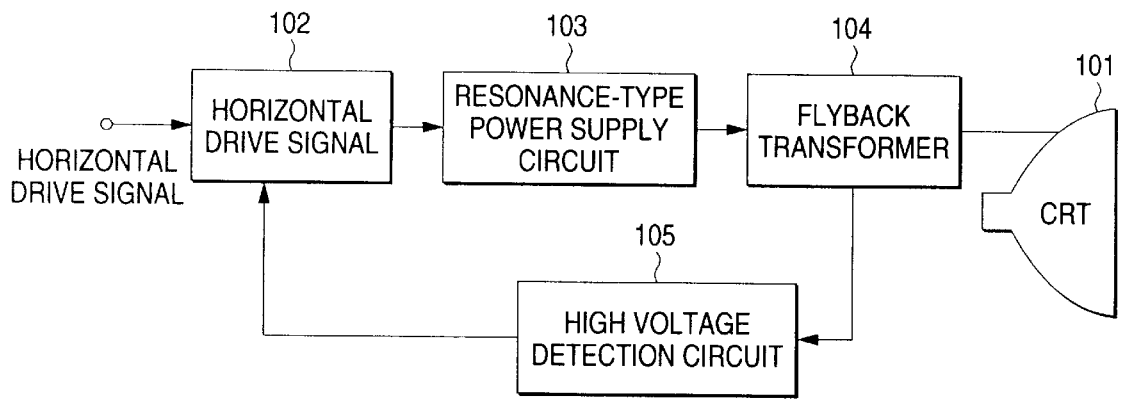
FIG. 9A is a block diagram showing the arrangement of a conventional general high voltage power supply circuit, in which the fundamental arrangement of the high voltage power supply circuit is shown.

It is certified that error appears in the above-indentified patent and that said Letters Patent is hereby corrected as shown below:

```
On Drawings Sheet, Sheet 8 of 9, FIG. 9A, Top left box,
    delete "HORIZONTAL DRIVE SIGNAL", and insert
    --HIGH VOLTAGE STABILIZING CIRCUIT--.

Figure 9B:
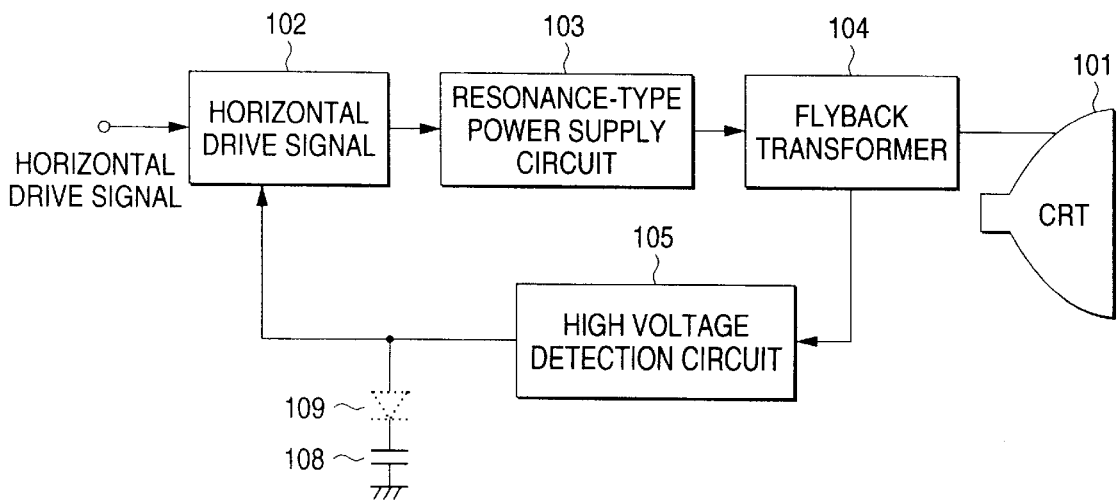
FIG. 9B is also a block diagram showing the arrangement of the conventional general high voltage power supply circuit, in which an example of the arrangement of the high voltage power supply circuit formed by taking the rising time of a high output voltage into consideration is shown.
Figure 10:
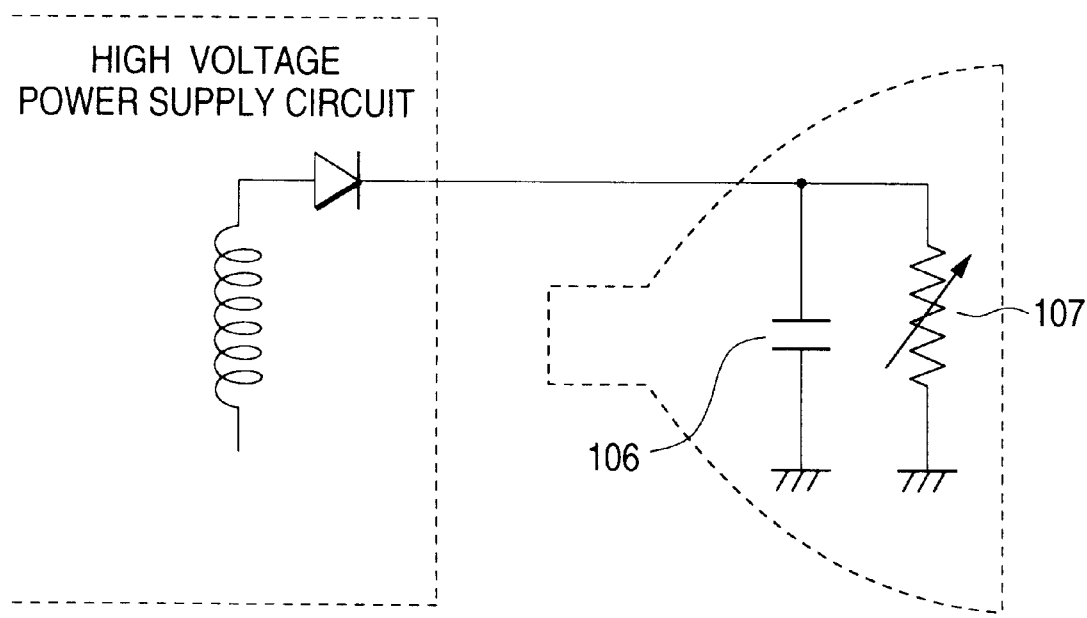
FIG. 10 is an explanatory diagram showing the equivalent circuit of the load side of a high voltage power supply circuit.

On Drawings Sheet, Sheet 8 of 9, FIG. 9B, Top left box,
    delete "HORIZONTAL DRIVE SIGNAL", and insert
    --HIGH VOLTAGE STABILIZING CIRCUIT--.

Column 5, line 46, delete "Sa", and insert --5a--.
```

Signed and Sealed this

Twenty-fourth Day of April, 2001

Attest:

NICHOLAS P. GODICI

*Attesting Officer*   *Acting Director of the United States Patent and Trademark Office*